US007210832B2

(12) United States Patent
Huang

(10) Patent No.: US 7,210,832 B2
(45) Date of Patent: May 1, 2007

(54) ILLUMINATION APPARATUS OF LIGHT EMITTING DIODES AND METHOD OF HEAT DISSIPATION THEREOF

(75) Inventor: Bin-Juine Huang, Taipei (TW)

(73) Assignee: Advanced Thermal Devices, Inc., Sindian, Taipei (TW)

( * ) Notice: Subject to any disclaimer, the term of this patent is extended or adjusted under 35 U.S.C. 154(b) by 74 days.

(21) Appl. No.: 10/948,151

(22) Filed: Sep. 24, 2004

(65) Prior Publication Data

US 2005/0092469 A1 May 5, 2005

(30) Foreign Application Priority Data

Sep. 26, 2003 (TW) .............................. 92126707 A

(51) Int. Cl.
*B60Q 1/00* (2006.01)
*F21V 29/00* (2006.01)
*F21V 7/20* (2006.01)
*F28D 17/00* (2006.01)

(52) U.S. Cl. ...................... 362/547; 362/294; 362/373; 362/264; 362/345; 165/104.26; 165/104.33

(58) Field of Classification Search ................ 362/294, 362/345, 547, 373, 264, 365
See application file for complete search history.

(56) References Cited

U.S. PATENT DOCUMENTS

| | | | | |
|---|---|---|---|---|
| 4,515,209 | A * | 5/1985 | Maidanik et al. | 165/104.22 |
| 5,268,812 | A * | 12/1993 | Conte | 361/698 |
| 5,857,768 | A * | 1/1999 | Ziegler et al. | 362/294 |
| 6,863,117 | B2 * | 3/2005 | Valenzuela | 165/104.26 |
| 6,910,794 | B2 * | 6/2005 | Rice | 362/547 |
| 7,063,129 | B2 * | 6/2006 | Makino et al. | 165/104.26 |
| 2004/0120148 | A1 * | 6/2004 | Morris et al. | 362/264 |
| 2005/0258438 | A1 * | 11/2005 | Arik et al. | 257/88 |
| 2006/0185827 | A1 * | 8/2006 | Huang et al. | 165/104.25 |

* cited by examiner

*Primary Examiner*—John Anthony Ward
*Assistant Examiner*—David Makiya
(74) *Attorney, Agent, or Firm*—Birch, Stewart, Kolasch & Birch, LLP

(57) ABSTRACT

An illumination apparatus of light emitting diodes and method of heat dissipation thereof are provided. The present illumination apparatus is associated with a loop heat pipe (LHP) device. The LHP device includes a condenser communicating with an evaporator. The illumination apparatus includes a base having a plurality of light emitting diodes disposed thereon and a cover with a light exit enclosing the base. The evaporator is associated with the base and the condenser is associated with the cover. The heat generated from the light emitting diodes is conducted to the cover, and thereby dissipated away.

29 Claims, 4 Drawing Sheets

ILLUMINATION APPARATUS OF LIGHT EMITTING DIODES AND METHOD OF HEAT DISSIPATION THEREOF

This Nonprovisional application claims priority under 35 U.S.C. §119(a) on Patent Application No(s). 092126707 filed in Taiwan, Republic of China on Sep. 26, 2003, the entire contents of which are hereby incorporated by reference.

BACKGROUND OF THE INVENTION

1. Field of the Invention

The present invention relates to an illumination apparatus of light emitting diodes with a heat dissipation device, and more particularly to an illumination apparatus of light emitting diodes associated with a loop heat pipe device.

2. Description of the Prior Art

Light emitting diode (LED) has many advantages, such as small volume, higher illumination efficiency, energy saving and so on. Especially, the photo-electrical power conversion efficiency of the light emitting diode has been rapidly improved during the last twenty years, thus the light emitting diode is regarded as the main illumination source in the future. For energy conservation, the light emitting diode will certainly and gradually being substituted for a lot kinds of today's illumination sources, such as light bulbs.

Today, the light emitting diodes are applied popularly and commonly used in traffic signal lights, electric broads, flash lights, and so on. Although improving the high-power illuminating technology or quality of the light emitting diodes is the future trend and demanded urgently, such as demanded in the application of reading light or protruding light, etc., that still exists some technical bottlenecks to overcome. The main bottleneck for the high-power illuminating technology is the insufficient heat dissipation ability of the traditional illumination apparatus of light emitting diodes often leads to the light emitting diodes in a high operational temperature to decrease theirs service life, further, even to cause them to burn down.

As a high-power or high-brightness illumination apparatus of light emitting diodes concerned, such as above 30~100 W (watt), it is hard to design an effective heat dissipation means for the LED illumination apparatus without fans. A traditional method of solving the heat dissipation problem is adapting a plurality of cooling fins attached on a base of the illumination apparatus and the heat generated from the light emitting diodes is conducted to the cooling fins via the base, then using an electric fan to blow the heat away, and thereby the heat is dissipated away. As the above-mentioned descriptions, the traditional method of heat dissipation usually requires a large space for setting up the plurality of cooling fins near the illumination apparatus and further needs to install an electric fan, that causes noise and reliability problems when it was used outdoors.

Another method of heat dissipation is adapting a conventional heat pipe device, however, the heat dissipation ability is limited due to the rigidity of the conventional heat pipe device and the limited length of conventional heat pipe device, usually can not be longer than 30 cm. The heat dissipation ability of a conventional heat pipe device is thus mostly less than 30 W. Therefore, the other traditional method also can not solve the heat dissipation problem of the high-power illumination apparatus of light emitting diodes effectively.

SUMMARY OF THE INVENTION

It is one of objectives of the present invention to provide an illumination apparatus of light emitting diodes. The heat generated from the light emitting diodes is conducted to a cover of the illumination apparatus via a loop heat pipe device, and then dissipated away effectively by the large heat dissipation area of the exterior surface of the cover.

It is another one of objectives of the present invention to provide an illumination apparatus of light emitting diodes associated with a loop heat pipe device used to dissipate the heat generated from the light emitting diodes away effectively and further to increase the service life of the light emitting diodes.

It is another one of objectives of the present invention to provide an illumination apparatus of light emitting diodes with a heat dissipation device. The heat dissipation device not only has an effective heat dissipation ability but also its structure is simple and easy to be fabricated or implemented on the illumination apparatus to make the illumination apparatus of light emitting diodes have higher economic value.

According to the above-mentioned objectives, the present invention provides an illumination apparatus of light emitting diodes mainly including an illumination apparatus and a loop heat pipe device. The illumination apparatus including a base, a plurality of light emitting diodes and a cover. The plurality of light emitting diodes are attached on the base, and the cover has a shell body with a first opening at its one terminal and a second opening at the opposite terminal to provide a light ray exit. The shell body encloses the base as well as the plurality of light emitting diodes to guide the light generated from the light emitting diodes to the light exit. The loop heat pipe device includes a evaporator, a condenser, a vapor connecting pipe and a liquid return flow connecting pipe. The evaporator has a body with a vapor outlet, a return flow entrance and a chamber having volatile liquid therein. The evaporator is associated with the base tightly, and one terminal of the vapor connecting pipe communicates with the vapor outlet and the another terminal of the vapor connecting pipe communicates with one of entrances of the condenser, wherein the condenser is associated with the shell body of the cover. One terminal of the liquid return flow connecting pipe communicates with one of exits of the condenser and the another terminal of the return flow connecting pipe communicates with the return flow entrance. The base of the illumination apparatus conducts and transmits the heat generated form the light emitting diodes into the shell body of the cover via the loop heat pipe device and then the heat is dissipated away by the large area of exterior surface of the cover, and that makes the present illumination apparatus have an effective heat dissipation ability, and further increases the service life of the present illumination apparatus.

The above-mentioned contents of the present invention and the following description of the preferred embodiments are only for example, not intended to limit the scope of the invention. Thus, many equal variations and modifications of the following embodiments could be made without departing form the spirit of the present invention should be covered by the following claims.

BRIEF DESCRIPTION OF THE DRAWINGS

The objectives, features of the present invention as well as the advantages thereof can be best understood through the following preferred embodiments and the accompanying drawings, wherein.

DESCRIPTION OF THE PREFERRED EMBODIMENT

The invention will be explained in detail in accordance with the accompanying drawings. It is necessary to illustrate that the drawings in the below could be in simplified forms and not drawn in proportion to the real cases. Further, the dimensions of the drawings are enlarged for explaining and understanding more clearly.

The loop heat pipe (LHP) device has many kinds of characters or advantages, for example, high heat transport rate (30 W~6000 W), far distance heat-transferring property (03.m~10 m), flexibility property (the diameter of the connecting pipe of the loop heat pipe device can be less than 2 mm), non-directional property (not influenced by the gravity) and unidirectional heat-transferring property. Therefore, it is very appropriate to use the loop heat pipe device to solve the heat dissipation problem for the illumination apparatus of light emitting diodes with high power or high brightness.

By the characters of the loop heat pipe device, in the present invention, a evaporator of the loop heat pipe device would be associated with the light emitting diodes through a base, and a condenser of the loop heat pipe device would be associated with a cover of the illumination apparatus, hence the heat generated form the light emitting diodes can be conducted to the cover of the illumination apparatus via the loop heat pipe device, and then dissipated away from the large area of exterior surface of the cover, and that makes the illumination apparatus of the present invention have an effective heat dissipation capability, and further increases the service life of the present illumination apparatus.

Figure 1A:
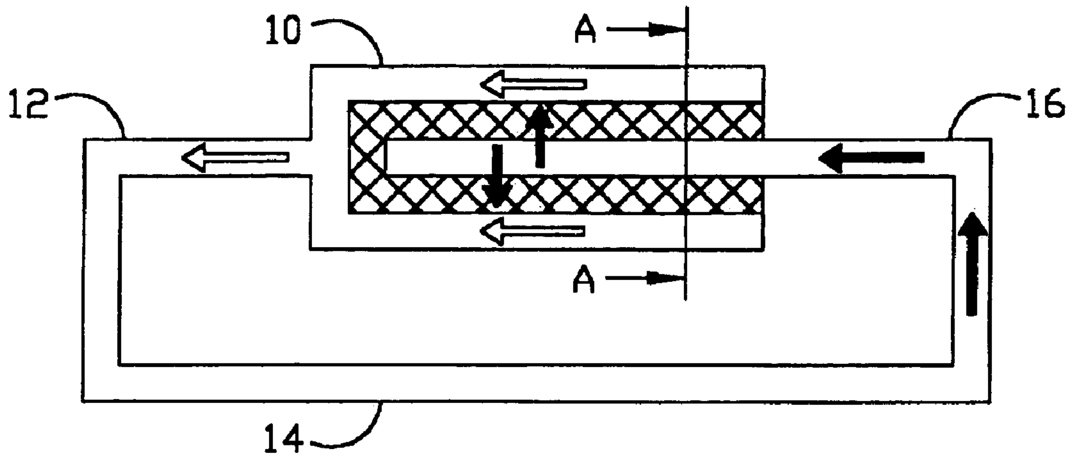
FIG. 1A is a schematic drawing of a structure of a loop heat pipe device of the present invention.
Figure 1B:
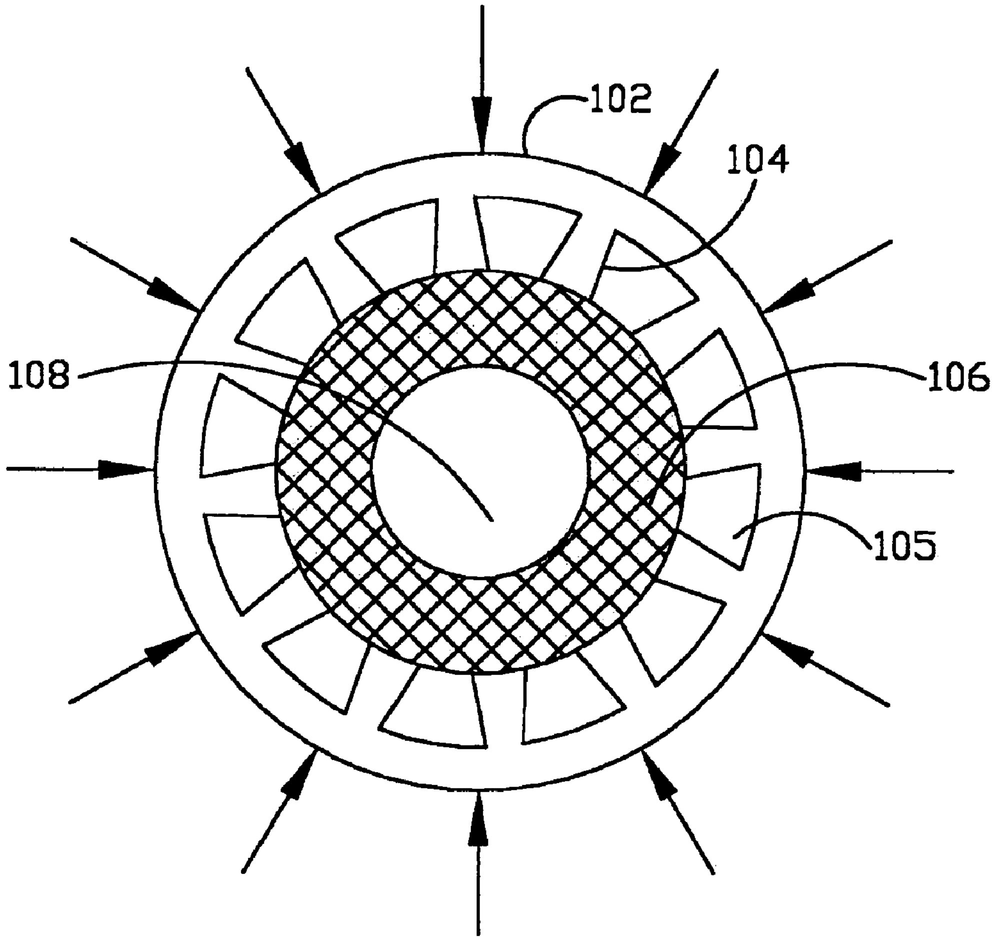
FIG. 1B is a schematic drawing of cross-section A—A of the loop heat pipe device of the present invention according to FIG. 1.

FIG. 1A is a schematic drawing of an embodiment of a loop heat pipe device according to the present invention. The loop heat pipe device includes an evaporator 10, a condenser 14, a vapor connecting pipe 12 and a liquid return flow connecting pipe 16. The evaporator 10 has a body with a vapor outlet, a return flow entrance and a chamber having volatile liquid therein. FIG. 1B is a schematic drawing of the cross-section A—A shown in FIG. 1 according to the evaporator 10. Referring now to FIG. 1B, the body of the evaporator 10 is a hollow metal cylinder shell 102 with a chamber therein, and a plurality of radial protruding members 104 surround around the metal cylinder shell 102 and extend to the inner of the metal cylinder shell 102. A porous member 106 with a hollow cylinder chamber is attached tightly within the metal cylinder shell 102 to form a plurality of vapor channels 105 between the metal cylinder shell 102 and the porous member 106. The hollow cylinder chamber of the porous member 106 is filled with volatile liquid 108. Due to the capillary effect, the volatile liquid 108 can permeate through the porous member 106 into the vapor channels 105.

Referring to 1A, one terminal of the vapor connecting pipe 12 communicates with the vapor outlet of the evaporator 10 and the another terminal communicates with one of entrances of the condenser 14. One terminal of the liquid return flow connecting pipe 16 communicates with one of exits of the condenser 14 and the another terminal communicates with the return flow entrance of the evaporator 10. The heat will be conducted to the metal cylinder shell 102 of the evaporator 10 and then conducted to the porous member 106 via the radial protruding members 104. Subsequently, the volatile liquid 108 absorbs the heat and vaporizes itself, and then the vapor enters the vapor connecting pipe 12 through the vapor channels 105. Following, the vapor flows through the condenser 14 to dissipate the heat away, and at the same time, the vapor is condensed to liquid, then the liquid flows back to the evaporator 10 through the liquid return flow connecting pipe 16.

Figure 2A:
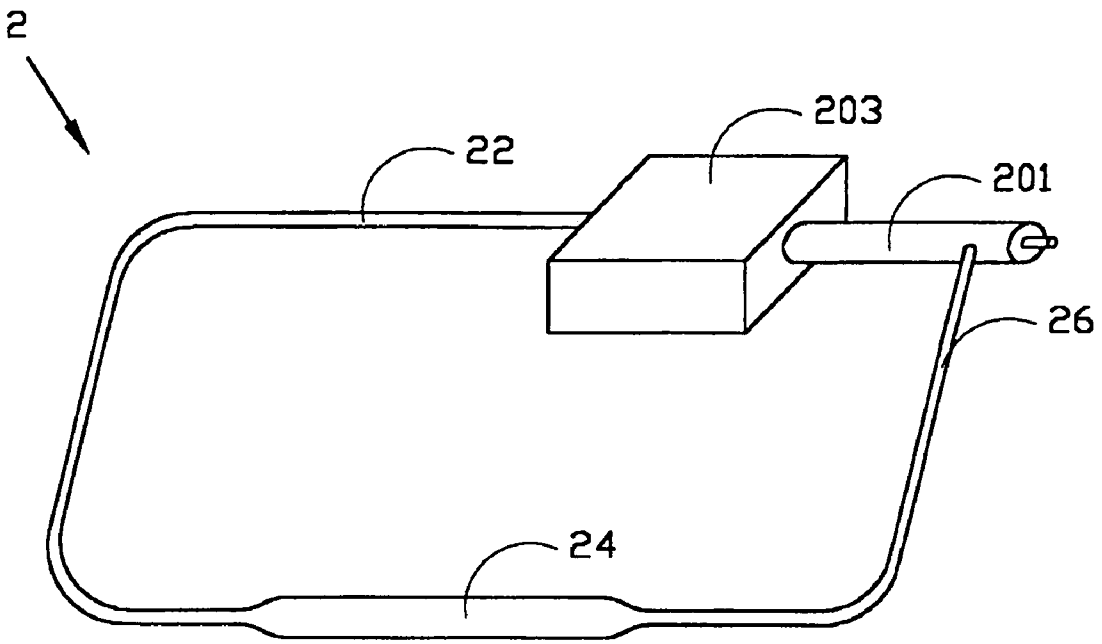
FIG. 2A is a schematic figure drawing of another preferred embodiment of a loop heat pipe device according to the present invention.
Figure 2B:
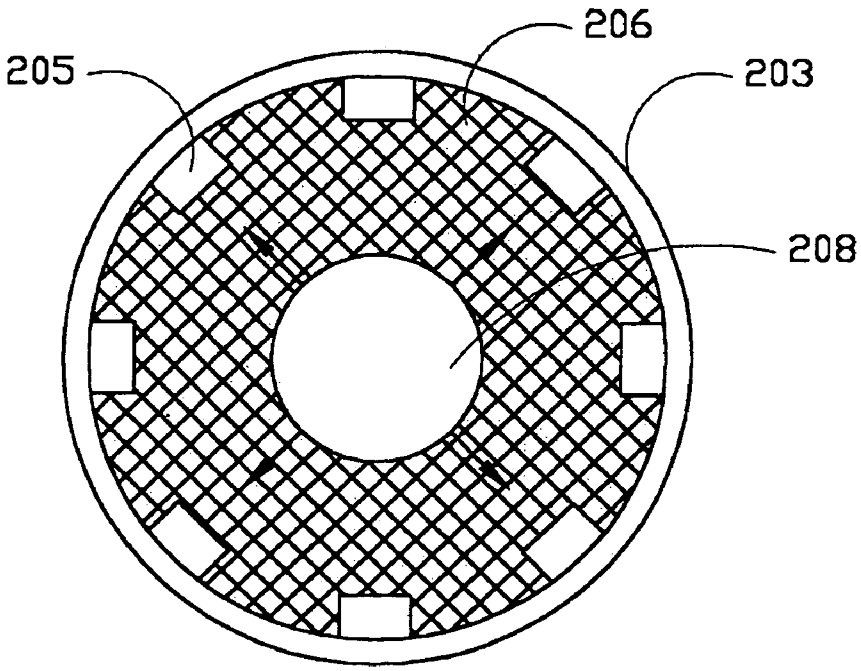
FIG. 2B is a schematic drawing of a cross-section view of the loop heat pipe device according to FIG. 2A.

FIG. 2A is a schematic figure drawing of another preferred embodiment of a loop heat pipe device according to the present invention. The structure of the loop heat pipe device is similar to the one of the loop heat pipe device shown in FIG. 1A. Referring to FIG. 2A, the loop heat pipe device 2 also includes: an evaporator having a chamber 201 and a container 203 with a porous member therein, a vapor connecting pipe 22, a condenser 24 and a liquid return flow connecting pipe 26. The main difference between the loop heat pipe device of FIG. 1A and the loop heat pipe device of FIG. 2A is the inner structure of the evaporator. FIG. 2B shows a schematic drawing of a cross-section view of the evaporator according to FIG. 2A. Referring to FIG. 2B, the container 203 of the evaporator is a metal container with a chamber therein. A porous member 206 with a hollow cylinder chamber is attached tightly within the chamber of the container 203, and a plurality of vapor channels 205 are formed between the container 203 and the porous member 206. The hollow cylinder chamber of the porous member 206 is filled with volatile liquid 208. Due to the capillary effect, the volatile liquid 208 can permeate through the porous member 206 into the vapor channels 205. In the embodiment, heat will be conducted to the container 203 of the evaporator and then transferred to the porous member 206 without through the radial protruding members 104 shown in FIG. 1B.

Figure 3A:
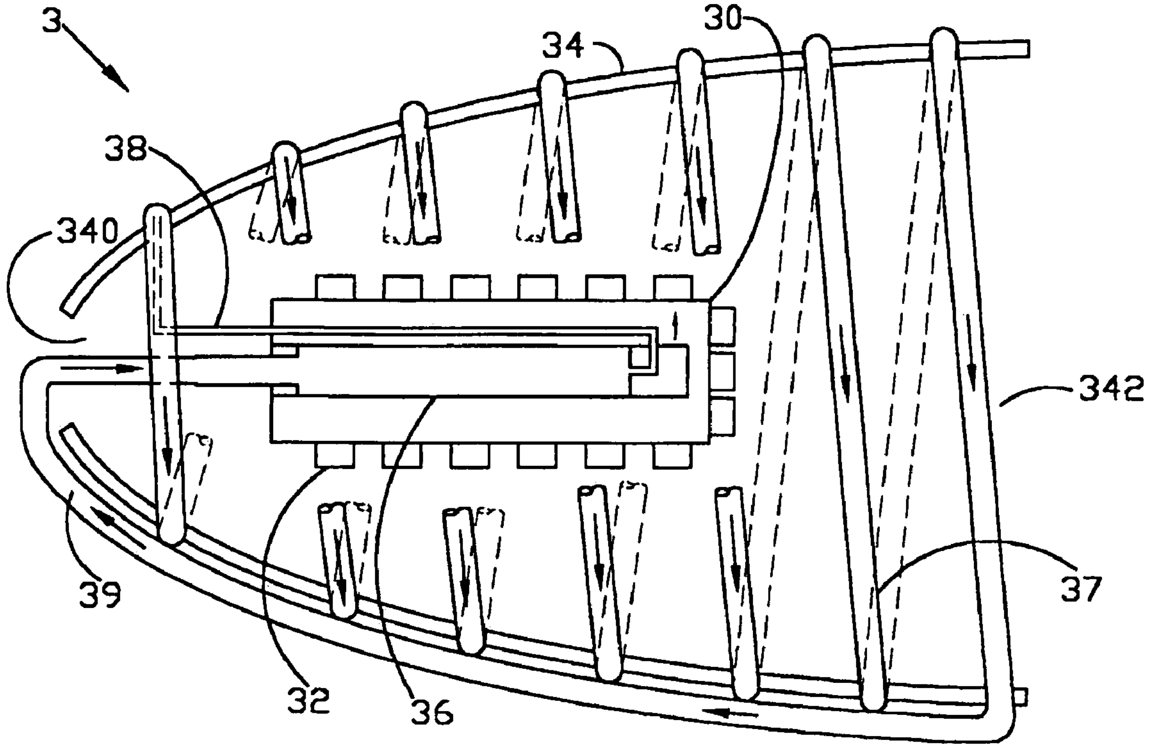
FIG. 3A is a schematic drawing of a portion side and cross-section view of an illumination apparatus associated with the loop heat pipe device shown in FIG. 1A or shown in FIG. 2A according to the present invention.

FIG. 3A shows a schematic drawing of a portion side and cross-section view of a preferred embodiment of a illumination apparatus associated with the loop heat pipe device shown in FIG. 1A or with the loop heat pipe device shown in FIG. 2A according to the present invention. The preferred embodiment includes an illumination apparatus and a loop heat pipe device, wherein the illumination apparatus includes a base 30, a plurality of light emitting diodes 32 and a cover 34. The loop heat pipe device includes a evaporator 36, a plurality of condensing pipes 37 consisted of a condenser, a vapor connecting pipe 38 and a liquid return flow connecting pipe 39. The base 30 of the illumination apparatus 3 can be a metal base. The plurality of light emitting diodes 32 are attached on the base 30, and the cover 34 has a shell with a first opening 340 at its one terminal and a second opening 342 at the opposite terminal to provide a light exit. The shell of the cover 34 encloses the base 30 as well as the plurality of light emitting diodes 32 to guide the light emits from the light emitting diodes 32 to the light exit. The structure figure of the shell of the cover 34 could be a paraboloid, spherical, ellipsoid or conical shape.

Figure 3B:
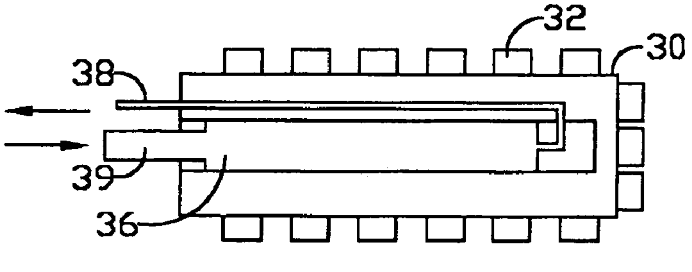
FIG. 3B is a schematic drawing of a combined condition of the base and the evaporator of the loop heat pipe device according to FIG. 3A.
Figure 4:
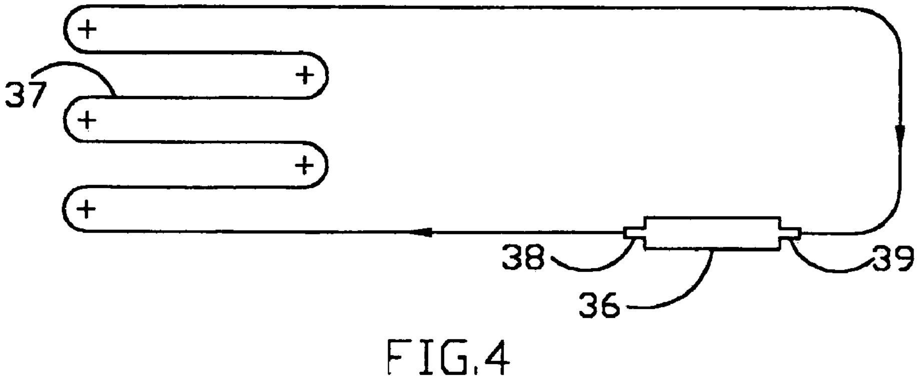
FIG. 4 is a schematic view of an assembly structure of the loop heat pipe device according to FIG. 3A.

FIG. 3B is a schematic drawing of a combined condition of the evaporator 36 and the base 30 of the present invention, wherein the evaporator 36 of the loop heat pipe device has a body and the inner structure of the body is shown as FIG. 1B. The evaporator 36 has a vapor outlet, a return flow entrance and a chamber filled with volatile liquid. The volatile liquid can be water, acetone, ammonia, and other refrigerant with a low boiling point. The body of the evaporator 36 is mounted on the base 30 and associated with the base 30 tightly, since the base 30 has a containing room to be wedge with the evaporator 36 therein. Referring to FIG. 3A again, the vapor outlet of the evaporator 36 communicates with one terminal of the vapor connecting pipe 38, and the vapor connecting pipe 38 stretches out from the first opening 340 of the cover 34, as shown in FIG. 3A. The another terminal of the vapor connecting pipe 38 communicates with one entrance of the condenser. The condensing pipes 37 of the condenser are coiled around and attached to the exterior surface of the shell of the cover 34 by a method, such as welding, sticking with adhesive, and so on; or the condensing pipes 37 could be directly formed together with the cover 34 to be an unity member. Further, the condensing pipes 37 can be formed with capillaries whose diameter can be as small as to 2 mm. One exit of the condenser communicates with one terminal of the liquid return flow connecting pipe 39 and the another terminal of the liquid return flow connecting pipe 39 communicates with the return flow entrance of the evaporator 36. The liquid return flow connecting pipe 39 can be a capillary pipe, and the liquid in the condensing pipes 37 can be absorbed into the chamber of the evaporator 36 via the capillary force of the porous member, as shown in FIG. 1B or in FIG. 2B. FIG. 3C is a schematic drawing of an assembly structure of the loop heat pipe device shown in FIG. 4, wherein the loop system, as shown in FIG. 4, made up of the evaporator 36, the condensing pipes 37, the vapor connecting pipe 38 and the liquid return flow connecting pipe 39 is in a closed system filled with only working fluid 108.

Also referring to FIG. 3A, the heat generated form the light emitting diodes 32 is conducted to the evaporator 36 via the base 30, the volatile liquid in the evaporator 36 absorbs the heat and then vaporize itself. Following, the vapor flows into the vapor connecting pipe 38 via the vapor outlet of the evaporator 36 and then flows through the condensing pipes 37. Since the condensing pipes 37 are mounted on the shell of the cover 34, the heat carried by the vapor can be dissipated away rapidly via the large area of exterior surface of the cover 34. The vapor in the condensing pipes 37 will condense to liquid immediately when it encounters the cold environment, and then the liquid flows back to the evaporator 36 through the liquid return flow connecting pipe 39 by the capillary force induced by the porous member of the evaporator 36. Therefore, by the loop heat pipe device, the heat generated from the light emitting diodes can be conducted to the cover 34 and dissipated away via the large area of exterior surface of the cover 34, and further the amount of the heat dissipated through the present device can even reach to more than 50 W, even without using fans and that make the service life of the present illumination apparatus of light emitting diodes increase to more than several hundred thousand hours. Additionally, if the area of exterior surface of the cover 34 is not large enough for a great high power illumination apparatus, an electric fan can be added to help to dissipate a great amount of heat.

Figure 5:
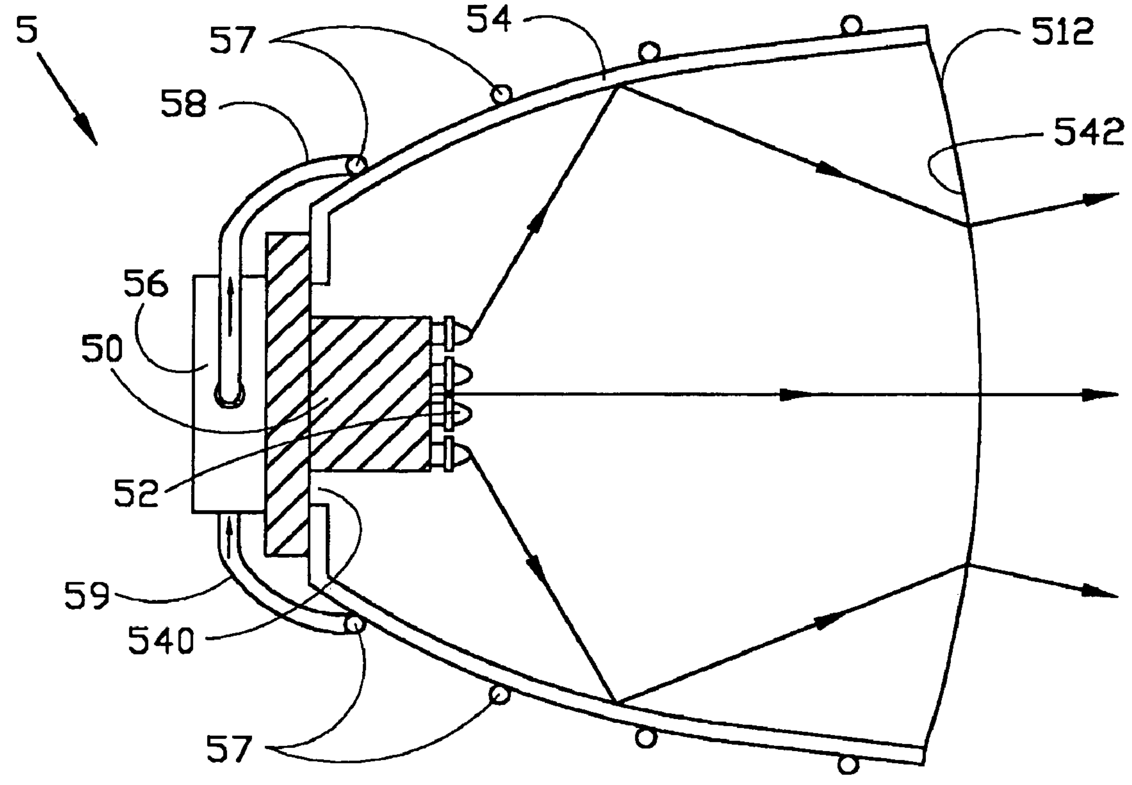
FIG. 5 is a schematic drawing of a portion side and cross-section view of an another illumination apparatus associated with the loop heat pipe device according to the present invention.
Figure 6:
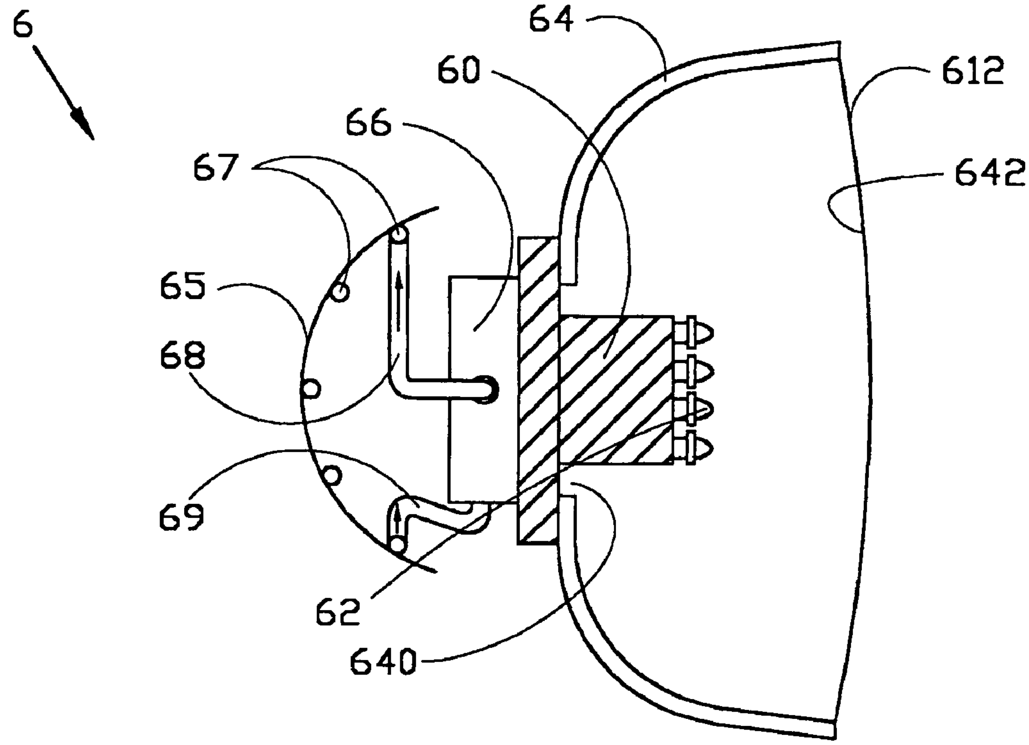
FIG. 6 is a schematic drawing of a portion side and cross-section view of an another illumination apparatus associated with the loop heat pipe device according to the present invention.

FIG. 5 and FIG. 6 are another two preferred embodiments according to the present invention, they show respectively a schematic drawing of a portion side and cross-section view of a illumination apparatus associated with the loop heat pipe device shown in FIG. 1A or in FIG. 2A. Referring to FIG. 5, the structure of the illumination apparatus 5 is similar to the one of the illumination apparatus 3 shown in FIG. 3A, but there are still some differences between them. In the illumination apparatus 5, a cover 54 has a shell with a first opening 540 at its one terminal and a second opening 542 at the opposite terminal to provide a light exit, wherein the interior surface of the shell of the cover 54 is plated with reflecting material thereon used to reflect light ray. A base 50 is associated with the cover 54 at the first opening 540 and a lens 512 is mounted on the second opening 542. A plurality of light emitting diodes 52 are attached (or disposed) on the base 50, wherein the plurality of light emitting diodes 52 are only located at one side of the base 50 and face to the second opening 542, so that the light ray from the plurality of light emitting diodes 52 can be reflected and guided to the second opening 542 by the shell of the cover 54 as the arrow line show in FIG. 5. Also, a loop heat pipe device 56 is mounted on the base 50 tightly, wherein one terminal of a vapor connecting pipe 58 is communicated with the vapor outlet of a evaporator of the loop heat pipe device 56 and the another terminal is communicated with one entrance of the condenser of the loop heat device 56. And one terminal of a liquid return flow connecting pipe 59 is communicated with one exit of the condenser of the loop heat device 56, and the another terminal of the liquid return flow connecting pipe 59 is communicated with the return flow entrance of the evaporator of the loop pipe device 56. The condensing pipes 57 of the condenser are also coiled around and attached to the exterior surface of the shell of the cover 54.

The process of heat dissipation of the illumination apparatus 5 is similar to the one of the illumination apparatus 3 in FIG. 3. In the illumination apparatus 5, the heat generated form the light emitting diode 52 will be conducted to both cover 54 and the evaporator of the looped heat pipe 56 via the base 50, and then the vapor of the evaporator generated due to the heat is then transferred to the condensing pipes 57 through the vapor connecting pipe 58. Following, the heat is dissipated away via the area of the exterior surface of cover 54 and then the vapor is condensed into liquid. Subsequently, the liquid is guided back to the evaporator of the loop heat pipe device 56 through the liquid return flow connecting pipe 59.

Referring to FIG. 6, in the illumination apparatus 6, a cover 64 also has a shell with a first opening 640 at its one terminal and a second opening 642 at the opposite terminal to provide a light exit, wherein the interior surface of the cover 64 is also plated with reflecting material thereon used to reflect light ray. A base 60 is associated with the cover 64 at the first opening 640 and a lens 612 is mounted on the second opening 642. A plurality of light emitting diodes 62 are attached on the base 60, wherein the plurality of light emitting diodes 62 are also only located at one side the base 60 and face to the second opening 642. A loop heat pipe device 66 is mounted on the base 60 tightly, wherein one terminal of a vapor connecting pipe 68 is communicated with the vapor outlet of a evaporator of the loop pipe device 66 and the another terminal of the vapor connecting pipe 68 is communicated with one entrance of the condenser of the loop heat device 66. And one terminal of a liquid return flow connecting pipe 69 is communicated with one exit of the condenser of the loop heat device 66, and the another terminal is communicated with the return flow entrance of the evaporator. In this embodiment, the condenser of the loop heat pipe device 66 includes a cooling plate 65 as shown in FIG. 6 and the condensing pipes 67 of the condenser are coiled around and attached to the exterior surface of the cooling plate 65, wherein the cooling plate 65 could be made of metal. The cooling plate 65 is associated with the cover 64 through a plurality of screws (not shown). The loop heat pipe 66 and the cooling plate 65 form a separate cooling device that connects with the cover 64, and thus it would be easy to disassemble the cooling device form the cover 64 and convenient to repair the cooling device, moreover, it would be easier to fabricate the illumination apparatus with such a cooling device. In other words, the main difference between the illumination apparatus 6 and the illumination apparatus 5 of FIG. 5 includes the structure and the installing manner of the condenser.

As the process of the heat dissipation concerned, in the illumination apparatus 6, the heat generated from the light emitting diode 62 will be also conducted to both the cover 64 and the evaporator of the loop heat pipe 66 via the base 60, and the vapor of the evaporator generated due to the heat is then transferred to the condensing pipes 67 of the condenser through the vapor connecting pipe 68. Following, the heat is dissipated away via both the area of the cover 64 and the cooling plate 65 of the condenser, then the vapor is condensed into liquid when it encounters the cold environment, and at the same time, the liquid flows back to the evaporator of the loop heat pipe device 66 through the liquid return flow connecting pipe 69 by the capillary force induced by the porous member of the evaporator. So, heat generated form the light emitting diodes 62 is directed to both the loop heat pipe device 66 and the cover 64 through the base 60, therefore to increase the heat dissipation capability. As the above mentions, though all the structures of the several embodiments presented in the invention are different in some way, by the loop heat pipe device, the heat generated from the light emitting diodes could always be dissipated away efficiently.

The above-mentioned preferred embodiments of the present invention are just for example, not limits. Thus, many variations and modifications of the embodiments made without departing form the spirit of the present invention should be covered by the following claims.

What is claimed is:

1. A method for dissipating heat for an illumination apparatus of light emitting diodes, comprising:

associating a loop heat pipe device with said illumination apparatus of light emitting diodes, said loop heat pipe device having a condenser and a evaporator, wherein said condenser and said evaporator contain volatile liquid therein, said condenser communicates with said evaporator, said illumination apparatus of light emitting diodes has a cover and a base with a plurality of light emitting diodes thereon, said evaporator is associated with said base, and said condenser is flexibly and around associated with said cover to fit the shape of said cover; and conducting the heat generated from said plurality of light emitting diodes to said cover to dissipate said heat via said loop heat device.

2. The method according to claim 1, wherein said evaporator transfers vapor which is generated due to said heat to said condenser, and then the heat of said vapor is dissipated via said cover, and said vapor is condensed into liquid, and then transmitting said liquid back to said evaporator.

3. The method according to claim 2, wherein said transmitting said liquid back to said evaporator is accomplished by the capillarity effect of a porous member mounted in said evaporator.

4. The method according to claim 2, wherein said heat generated from said plurality of light emitting diodes is conducted to said evaporator of said loop heat pipe device via said base.

5. The method according to claim 1, further comprises using an electric fan to help to dissipate said heat away.

6. The method according to claim 1, wherein said condenser and said base are associated with said cover, and said heat is conducted to said cover both through said loop heat pipe device mid said base directly.

7. The method according to claim 1, further comprises associating a cooling plate with said condenser; and conducting said heat both to said cover and said cooling plate.

8. The method according to claim 7, wherein said base is associated on said cover, and said heat is conducted to said cover through said base directly.

9. The method according to claim 8, wherein said heat is dissipated away via both said cover and said cooling plate.

10. The method according to claim 7, wherein said evaporator transfers vapor which is generated due to said heat to said condenser, and then the heat of said vapor is dissipated via said cooling plate, and said vapor is condensed into liquid, and then transmitting said liquid back to said evaporator.

11. The method according to claim 10, wherein said heat generated from said plurality of light emitting diodes is conducted to said evaporator of said loop heat pipe device via said base.

12. The method according to claim 1, wherein the inside diameter of said condenser is less than 2 mm, and the total length of said condenser is longer than 600 mm.

13. A illumination apparatus of light emitting diodes, comprising:

an illumination apparatus having a base, a plurality of light emitting diodes, and a cover, wherein said plurality of light emitting diodes are disposed on said base, said cover has a shell, said shell has a first opening at its one terminal and a second opening at the other terminal opposite to said one terminal used to be a light exit, and said shell encloses said base and said plurality of light emitting diodes, such that light emits from said plurality of light emitting diodes is guided to said light exit; and a loop heat pipe device having a evaporator, a condenser, a vapor connecting pipe, and a liquid return flow connecting pipe, wherein said evaporator has a vapor outlet, a return flow entrance, and a chamber having volatile liquid therein, said evaporator is associated with said base tightly, said condenser is flexibly coiled around said shell of said cover to fit the shape of said shell, one terminal of said vapor connecting pipe is communicated with said vapor outlet, the other terminal of said vapor connecting pipe is communicated with one entrance of said condenser, one terminal of said liquid return flow connecting pipe is communicated with one exit of said condenser, and the other terminal of said liquid return flow connecting pipe is communicated with said evaporator;

whereby the heat generated from said plurality of light emitting diodes is conducted to said shell of said cover via said base, and said heat is conducted to said cover through said loop heat pipe device.

14. The illumination apparatus of light emitting diodes according to claim 13, wherein said base is associated with said cover and said heat is conducted to said cover through said loop heat pipe device and said base directly.

15. The illumination apparatus of light emitting diodes according to claim 13, wherein said chamber of said evaporator has a porous member with a hollow space therein to envelop said volatile liquid, and said volatile liquid can permeate through said porous member.

16. The illumination apparatus of light emitting diodes according to claim 13, wherein said volatile liquid is selected from the group consisting of water, acetone, ammonia, and refrigerant with a low boiling point.

17. The illumination apparatus of light emitting diodes according to claim 13, wherein said base has a containing room used to be wedged with said evaporator therein.

18. The illumination apparatus of light emitting diodes according to claim 13, wherein said base is made of metal.

19. The illumination apparatus of light emitting diodes according to claim 13, wherein said condenser has a plurality of condensing pipes coiled around and attached to the exterior surface of said shell of said cover.

20. The illumination apparatus of light emitting diodes according to claim 19, wherein said plurality of condensing pipes are made of capillary pipes.

21. The illumination apparatus of light emitting diodes according to claim 19, wherein said plurality of condensing pipes are integrated with said cover for forming a unity member.

22. The illumination apparatus of light emitting diodes according to claim 19, wherein said plurality of condensing pipes are welded on said exterior surface of said cover.

23. The illumination apparatus of light emitting diodes according to claim 19, wherein said plurality of condensing pipes are stuck on said exterior surface of said cover with a adhesive.

24. The illumination apparatus of light emitting diodes according to claim 13, wherein the structure figure of said shell of said cover is selected from the group consisting of paraboloid shape, spherical shape, ellipsoid shape, and conical shape.

25. The illumination apparatus of light emitting diodes according to claim 13, further comprises an electric fan to help to dissipate said heat away.

26. The illumination apparatus of light emitting diodes according to claim 13, further comprises a cooling plate associated with said condenser, wherein said heat is conducted to both said cover and said cooling plate via said base.

27. The illumination apparatus of light emitting diodes according to claim 26, wherein said base and said cooling plate are both associated with said cover.

28. The illumination apparatus of light emitting diodes according to claim 26, wherein said condenser has a plurality of condenser pipes coiled around and attached to the exterior surface of said cooling plate.

29. The illumination apparatus of light emitting diodes according to claim 13, wherein the inside diameter of said condenser, said vapor connecting pipe, and said liquid return flow connecting pipe is less than 2 mm, and the total length of said condenser, said vapor connecting pipe, and said liquid return flow connecting pipe is longer than 600 mm.

* * * * *